(12) United States Patent
Torkkola et al.

(10) Patent No.: US 10,783,442 B1
(45) Date of Patent: Sep. 22, 2020

(54) DEMAND FORECASTING VIA DIRECT QUANTILE LOSS OPTIMIZATION

(71) Applicant: Amazon Technologies, Inc., Seattle, WA (US)

(72) Inventors: Kari E. J. Torkkola, Seattle, WA (US); Ru He, Seattle, WA (US); Wen-Yu Hua, Seattle, WA (US); Alexander Matthew Lamb, Montreal (CA); Balakrishnan Narayanaswamy, San Jose, CA (US); Zhihao Cen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 905 days.

(21) Appl. No.: 15/384,007

(22) Filed: Dec. 19, 2016

(51) Int. Cl.
*G06N 3/04* (2006.01)
*G06N 7/00* (2006.01)
*G06N 3/08* (2006.01)

(52) U.S. Cl.
CPC .............. *G06N 7/005* (2013.01); *G06N 3/04* (2013.01); *G06N 3/0472* (2013.01); *G06N 3/08* (2013.01)

(58) Field of Classification Search
CPC ............................. G06N 7/005; G06N 3/0472
See application file for complete search history.

(56) References Cited

U.S. PATENT DOCUMENTS

| 2014/0365276 | A1* | 12/2014 | Harsha | G06Q 10/06315 |
| | | | | 705/7.31 |
| 2017/0236136 | A1* | 8/2017 | He | G06N 7/005 |
| | | | | 705/7.31 |
| 2017/0308846 | A1* | 10/2017 | de Mars | G06N 20/20 |
| 2018/0096290 | A1* | 4/2018 | Awad | G06Q 30/0635 |

OTHER PUBLICATIONS

Cannon, Alex J. "Quantile regression neural networks: Implementation in R and application to precipitation downscaling." Computers & geosciences 37.9 (2011): 1277-1284. (Year: 2011).*

(Continued)

*Primary Examiner* — Hal Schnee
(74) *Attorney, Agent, or Firm* — Kilpatrick Townsend & Stockton LLP

(57) ABSTRACT

Techniques described herein include a method and system for item demand forecasting that utilizes machine learning techniques to generate a set of quantiles. In some embodiments, several item features may be identified as being relevant to an item forecast and may be provided as inputs to a regression module, which may calculate a set of quantiles for each item. A set of quantiles may comprise a number of confidence levels or probabilities associated with calculated demand values for an item. In some embodiments, costs associated with the item may be used to select an appropriate quantile associated (e.g., based on a corresponding confidence level). In some embodiments, an item demand forecast may be generated based on the calculated demand value associated with the selected quantile. In some embodiments, one or more of the item may be automatically ordered based on that item demand forecast.

17 Claims, 9 Drawing Sheets

(56) References Cited

OTHER PUBLICATIONS

He, Yaoyao, et al. "Short-term power load probability density forecasting based on quantile regression neural network and triangle kernel function." Energy 114 (2016): 498-512. (Year: 2016).*

Nguyen, Hanh H., and Christine W. Chan. "Multiple neural networks for a long term time series forecast." Neural Computing & Applications 13.1 (2004): 90-98. (Year: 2004).*

Cho, et al. "Describing multimedia content using attention-based encoder-decoder networks," *IEEE Transactions on Multimedia*, vol. 17, No. 11 (Jul. 2015), 12 pages.

Dean, et al. "Large scale distributed deep networks," *Advances in Neural Information Processing Systems* (2012), pp. 1223-1231.

Krizhevsky, Alex. One weird trick for parallelizing convolutional neural networks. [online]. Arvix.org, 2014 [retrieved on Feb. 9, 2017] Retrieved from the Internet: <URL: https://arvix.org/abs/1404.5997>, 7 pages.

Meinshausen, Nicolai. "Quantile regression forests," *Journal of Machine Learning Research*, vol. 7 (Dec. 2006), pp. 983-999.

Van Merriënboer, et al. Blocks and fuel: Frameworks for deep learning., [online]. Arvix.org, Jun. 2015 [retrieved on Feb. 9, 2017] Retrieved from the Internet: <https://arxiv.org/abs/1506.00619 >, 5 pages.

* cited by examiner

DEMAND FORECASTING VIA DIRECT QUANTILE LOSS OPTIMIZATION

BACKGROUND

Modern inventory systems, such as those in mail order warehouses, supply chain distribution centers, and custom-order manufacturing facilities, face significant challenges in predicting item demand. In high-capacity inventory systems (e.g., inventory systems that manage thousands of items per day), there is a need to optimize the storage of inventory items in order to better utilize the storage space available. This typically entails determining which items are in demand and hence should fill that storage space. Mismanagement of item ordering can cost a high-capacity inventory system operator millions of dollars per year in lost revenue.

When implementing an item demand forecasting system, there are multiple techniques available for processing the large volumes of item demand and feature data. One such technique utilizes a neural network comprising an input layer, one or more hidden layer(s) and an output layer. The nodes in each layer connect to nodes in the subsequent layer and the strengths of these interconnections are typically learnt from data during the training process.

However, current forecasting systems that utilize neural network techniques are often limited to providing point forecasts. This is not ideal since most item providers would like to optimize those forecasts based on item-related costs.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a demand forecasting system that utilizes machine learning techniques to generate a probability distribution of demand, represented nonparametrically as a set of quantiles of the distribution. In some embodiments, several item features may be identified as being relevant to an item forecast. The features may include past item demand (e.g., sales) for the item during specific time periods and/or while certain conditions are present. In some embodiments, item features may comprise item demand relative to specific holidays or other events. Once the item features have been identified, they may be provided as inputs to a regression module, which may calculate a set of quantiles for each item. A set of quantiles may comprise a number of confidence levels or probabilities associated with calculated demand values for an item. In some embodiments, costs associated with the item may be used to select an appropriate quantile associated with a corresponding confidence level. In some embodiments, an item demand forecast may be generated based on the calculated demand value associated with the selected quantile. In some embodiments, one or more of the item may be automatically ordered based on that item demand forecast.

By way of illustrative example, consider the following scenario. To generate item demand forecasts, multiple features associated with a number of items may be used as input values to train a neural network. In this illustrative example, a set of quantiles may be generated such that each of the output nodes in the neural network may correspond to a quantile in the distribution. In other words, each output node may correspond to a single demand value that is associated with a percentile (e.g., a confidence level), an item, and a time grain (i.e., a time period for which the demand is to be calculated). In this example, the appropriate quantile to be used in generating an item demand forecast may be determined based on costs (e.g., a quantile may be selected that corresponds to a cost ratio associated with the item). The item demand forecast may then be generated using the demand value associated with that quantile.

Figure 1:
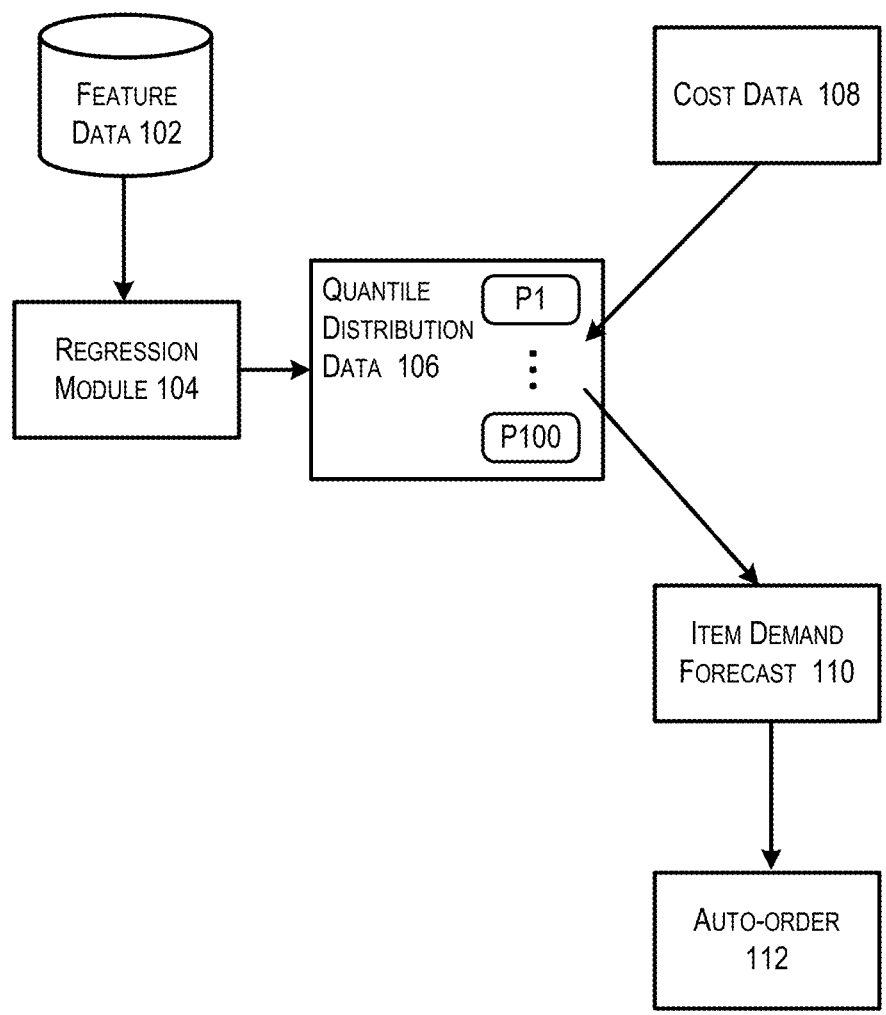
FIG. 1 depicts an illustrative example of a an automatic replenishment system that may be implemented in accordance with embodiments of the disclosure.

FIG. 1 depicts an illustrative example of an automatic replenishment system that may be implemented in accordance with embodiments of the disclosure. In FIG. 1, feature data 102 may be consumed by a regression module 104. The regression module 104 may be used to generate quantile distribution data 106. Once quantile distribution data 106 has been generated, a forecaster may use cost data 108 (as well as time data) to select an appropriate quantile from the quantile distribution data 106. The selected quantile may be used to generate an item demand forecast 110 (e.g., a prediction of a quantity of items to order). In some embodiments, the item demand forecast 110 may be used in an automatic fulfillment process, such as by generating an auto-order 112.

In at least some embodiments, feature data 102 may comprise any one or a combination of features specific to an item. For example, the feature data 102 may comprise historical purchase data (e.g., demand) for an item, historical visitors to a store webpage for an item, historical visitors to a detail webpage for an item, or any other suitable feature or combination of features. In some embodiments, features may include an indication of a relationship to an event. For example, item purchase history may be stored in relation to a distance from major holidays. In some embodiments, the features may be stored with respect to particular time periods (e.g., time grains).

In at least some embodiments, a regression module 104 may comprise any set of computer executable instructions configured to create quantile distribution data 106 in accordance with embodiments of the disclosure. In some embodiments, the regression module 104 may utilize any suitable machine learning technique to generate the quantile distribution data 106. For example, the regression module 104 may use an artificial neural network computational approach (aka a neural network) to generate a quantile distribution data 106. In another example, the regression module 104 may use a random decision forest computational approach to generate a quantile distribution data 106. Embodiments of the regression module 104, and techniques that may be employed by the regression module 104, are described in greater detail elsewhere in this disclosure.

In at least some embodiments, quantile distribution data 106 may comprise a number of quantiles (representing a percentage) and their associated values that make up a distribution. For example, a quantile may represent a percentage that a particular value with which it is associated is above a correct answer. More particularly, if a $90^{th}$ percentile contains a value n, then there is a 90% chance that the value n is greater than a correct answer. In accordance with embodiments of the disclosure, the quantile distribution data 106 may be indexed or otherwise separated based on a particular timeframe (e.g., a lead time or time grain). In accordance with embodiments of the disclosure, the quantile distribution data 106 may be calculated for a number of items available from an electronic catalog. The quantile distribution data 106 may also comprise combinations of data. For example, the quantile distribution data 106 may comprise percentile data for each item in a set of items for a number of lead times and a number of time grains. In this example, it is imagined that the quantile distribution data 106 may include a large number of entries (e.g., number of items*number of percentiles*number of potential lead times*number of potential time grains). Embodiments of the quantile distribution data 106 are described in greater detail elsewhere in this disclosure.

In at least some embodiments, cost data 108 may comprise any suitable indication of costs associated with carrying/not carrying a particular item. In some embodiments, the cost data 108 may comprise overage costs and underage costs. Overage costs are typically costs associated with storing an item, and may include costs of storage space for the item, costs associated with spoilage (e.g., if the item expires), or any other suitable cost that may be attributed to having too many of an item. Underage costs are typically costs associated with having too few of an item, and usually represent lost sales. Any number of factors may influence cost data 108. Additionally, cost data 108 may be different for each item in an electronic catalog. For example, larger items may cost more to store in storage than smaller items. In another example, items that require refrigeration may have a higher cost than items that do not require refrigeration. In some embodiments, some costs may vary based on time. For example, storage costs may be greater during the holidays, when a fulfillment center needs to stock high demand items.

In at least some embodiments, an item demand forecast 110 may comprise any suitable indication of a number of items that should be on-hand. In some embodiments, an item demand forecast 110 may be generated by identifying a quantile associated with a particular cost data 108. For example, an item demand forecast may be generated by finding a cost ratio, which represents a ratio of underage costs to a total costs (e.g., underage costs/(overage costs+ underage costs)). The quantile associated with this cost ratio (and associated with a particular lead time/time grain) may then be selected and the item demand forecast 110 may be generated based on a value associated with that quantile. For example, if the underage costs represent 90% of the total costs (i.e., the cost of having too few of the item is significantly higher than the cost of having too many of the item), then the quantile associated with the $90^{th}$ percentile is selected for the identified time period. In this example, a value associated with that quantile is used to calculate a number of the item to be included in the item demand forecast 110.

In at least some embodiments, an auto-order 112 may comprise any suitable auto-replenishment command. For example, upon generating an item demand forecast 110, an auto-order 112 may be generated as an order that is placed with one or more vendors automatically (e.g., without further human interaction). In this example, an auto-order 112 may comprise orders placed for a number of items based on one or more item demand forecasts.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
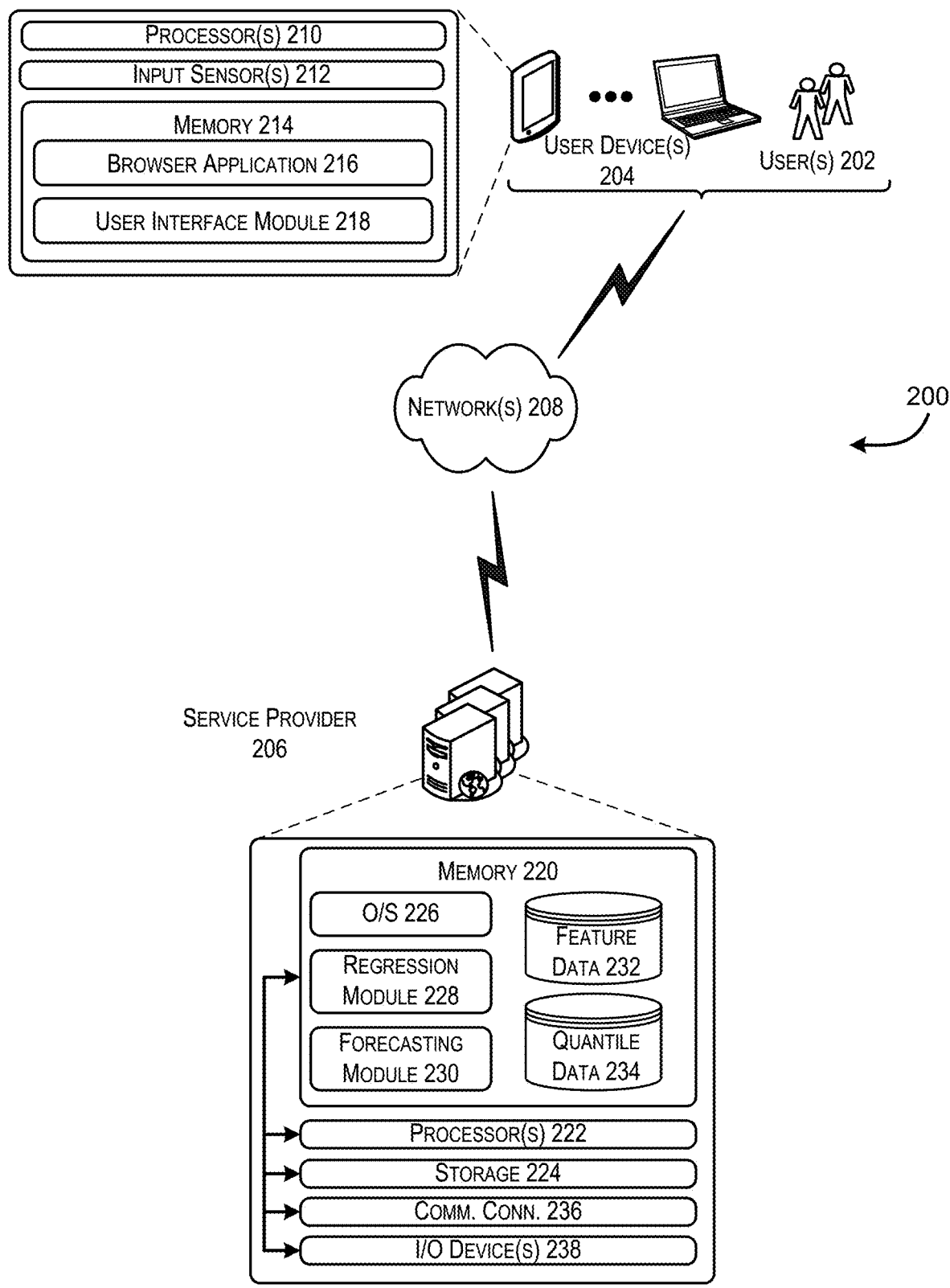
FIG. 2 depicts an illustrative example of a system or architecture in which techniques for generating a distribution of quantile data may be implemented.

FIG. 2 depicts an illustrative example of a system or architecture 200 in which techniques for generating a distribution of quantile data may be implemented. In architecture 200, one or more operators and/or users 202 may utilize user devices 204. In some examples, the user devices 204 may be in communication with a service provider 206 via the network(s) 208, or via other network connections.

The user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include a browser application 216. The memory 214 may also include a user interface module 218 that is capable of communicating information to be used in generating an item demand forecast. Although sample architecture 200 depicts a user interface module 218 as being included in the contents of the memory 214 of the user device 204, some embodiments may not include a user interface module 218 in memory 214 of the user device 204. In those embodiments in which the user interface module 218 is not included in memory 214, input received by the input sensors 212 may instead be processed by the service provider 206. This will be described in detail below.

In some embodiments, the user interface module 218 may be configured to communicate one or more forecast-specific data to the service provider 206 and receive an item demand forecast. In some embodiments, the user interface module 218 may be implemented in the form of a software application (e.g., a set of computer-executable instructions configured to perform a task). In some embodiments, the user 202 may provide details related to a requested forecast to the user interface module 218 via a graphical user interface (GUI). These details may be communicated to the service provider 206, which may subsequently generate an item demand forecast from the provided details. In at least some embodiments, one or more items may be ordered automatically based on the provided item demand forecast.

In some examples, the network(s) 208 may include any one or a combination of many different types of networks, such as cable networks, the Internet, wireless networks, cellular networks, and other private and/or public networks. While the illustrated example represents the users 202 accessing the service provider 206 via browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a service provider 206, such as to store, access, and/or manage data, develop and/or deploy computer applications, and/or interact with web content. The one or more service providers 206, perhaps arranged in a cluster of servers or as a server farm, may be configured to host a website (or combination of websites) viewable via the user device 204 or a web browser accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 216, such as with other applications running on the user device 204.

The service provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 222, as well as data generated during the execution of these programs. Depending on the configuration and type of service provider 206, the memory 220 may be volatile (such as random access memory (RAM)) and/or non-volatile (such as read-only memory (ROM), flash memory, etc.). The service provider 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for generating a prediction model that includes a set of quantiles (regression module 228) and/or a module for predicting a demand for an item (forecasting module 230). The memory 220 may also include feature data 232, which provides information related to features to be provided as input when generating a prediction model. The memory 220 may also include quantile data 234, which may be generated by the regression module 228 and may comprise information on each quantile in a distribution. In some embodiments, the feature data 232 and/or quantile data 234 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider 206. The service provider 206 may also contain communications connection(s) 236 that allow the service provider 206 to communicate with a stored database, another computing device or server, user terminals, and/or other devices on the network(s) 208. The service provider 206 may also include input/output (I/O) device(s) and/or ports 238, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing feature data 232, a database containing quantile data 234, and the one or more application programs or services for implementing the features disclosed herein, including a regression module 228 and/or a forecasting module 230.

In some embodiments, the regression module 228 may be configured to identify data within the feature data 232 and generate a prediction model that includes at least a set of quantiles. In some embodiments, the identified feature data 232 may be provided as input to a machine learning algorithm or technique. For example, the identified feature data 232 may be provided to a neural network in order to generate quantile data 234. In some embodiments, a number of features from feature data 232 may be identified as being relevant through feature engineering (e.g., features may be identified by an administrator). In some embodiments, a number of features may be identified using one or more machine learning techniques. For example, recurrent neural networks may be used to determine which features are most closely correlated to accuracy in generating item demand forecasts. The regression module 228 may also be provided a number of outputs (e.g., actual outcomes), which may be used to train the regression module 228. An illustrative example of a neural network that may be used in conjunction with regression module 228 is described in greater detail with respect to FIG. 4 below.

In some embodiments, the forecasting module 230 may be configured to receive data from the user interface module 218 on the user device 204 and generate an item demand forecast from the quantile data 234. For example, a user seeking a demand prediction may input a lead time (e.g., a point in time from which the demand is to be predicted), a time grain (e.g., an amount of time over which the demand is relevant), an indication of an item for which demand is to be calculated, and one or more costs associated with the item via the user interface module 218. The forecasting module 230 may be configured to receive that information and select an appropriate quantile from quantile data 234 based on that information. Once a quantile has been selected, the forecasting module 230 may be configured to generate an item demand forecast based on one or more values provided in relation to that quantile.

Figure 3:
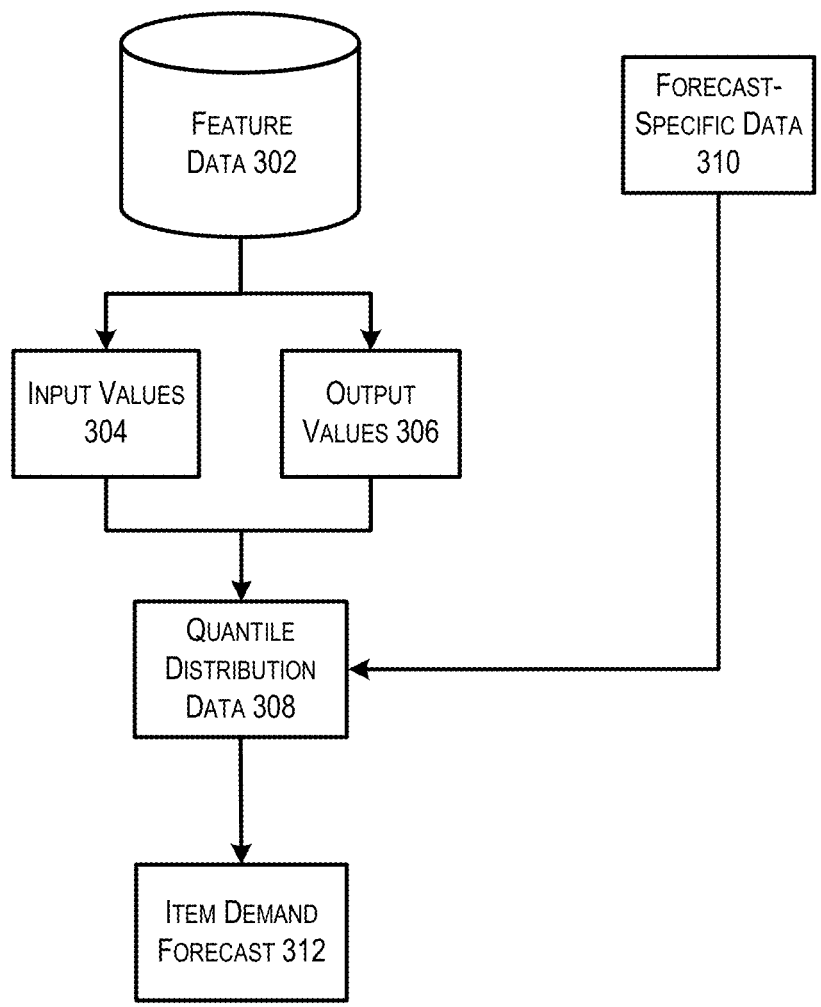
FIG. 3 depicts a process for generating quantile distribution data and subsequently an item demand forecast in accordance with at least some embodiments.

FIG. 3 depicts a process for generating quantile distribution data and subsequently an item demand forecast in accordance with at least some embodiments. Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by at least the one or more service providers 206 shown in FIG. 2. The code may be stored on a computer-readable storage medium, for example, in the form of a computer program including a plurality of instructions executable by one or more processors. The computer-readable storage medium may be non-transitory.

In process 300, various features of feature data 302 may be identified for use as input values 304 and/or output values 306 to be used by a regression module. As depicted by the arrows, values may be queried from the item feature data 302 to generate each of the input values 304 and output values 306 based on specified conditions (e.g., a data split). For example, input values 304 may be generated by querying all item-related features occurring before a predetermined date. In this example, the output values 306 may be generated by querying all item-related features occurring after that date. Feature data 302 may be an example of feature data 232 of FIG. 2. The set of input values 304 and/or output values 306 may be used to generate a quantile distribution data 308. Quantile distribution data 308, as used in the context of the disclosure, may comprise a set of quantiles defining a distribution of probabilities. The quantile distribution data 308 may be generated with respect to a number of different time grains, such that a distribution of probabilities is calculated with respect to each of those time grains.

In some embodiments, the set of input values 304 may comprise item features that fall within a predetermined category or meet a specified condition. This category or condition may be referred to as a data split. For example, the set of input values 304 may include item features occurring before a predetermined date. In another example, the set of input values may include item features of a particular type or category (e.g., features related to electronic books). In some embodiments, the set of input values may be formatted as a matrix/vector, or a set of matrices/vectors. In some embodiments, a data split may comprise a feature threshold such that the set of input values 304 may comprise item features in which the associated item exhibits a particular attribute.

In some embodiments, the set of output values 306 may comprise item features that fall within a second predetermined category. The set of output values 306 may or may not overlap with the set of input values 304. For example, in some cases the set of input values may include item features before a predetermined date and the set of output values may include item features after that date. In this example, item demand (e.g., sales) before a particular date may be mapped to item demand after that particular date in order to generate a prediction model. To do this, item features prior to the date may be selected as input values 304 and the item features after the date may be selected as output values 306.

As depicted by the arrow, a quantile distribution data 308 may be generated from the set of input values 304 and the set of output values 306 using various machine learning techniques. In one example embodiment, an artificial neural network machine learning technique may be used to generate the quantile distribution 308. Using this technique, the set of inputs 304 may be used as an input layer and the set of outputs may be used as an output layer. In this technique, the input layer may be connected to the output layer via one or more hidden layers. The generated quantile distribution 308 may include a number of connections between the hidden layers and the input layer and/or output layer, each of which may be assigned a numeric weight generated based on a pattern identified between the set of input values 304 and the set of output values 306. This technique is described in greater detail with respect to FIG. 4 below.

Once a quantile distribution data 308 has been generated, it may be used, along with forecast-specific data 310, to generate an item demand forecast 312. The forecast-specific data 310 may then be used to identify an appropriate quantile from the quantile distribution 308 to generate an item demand forecast 312. The item demand forecast 312 may include one or more item quantities that are predicted to result in the lowest costs to the service provider based on the forecast-specific data 310 and quantile distribution data 308. In some embodiments, the item demand forecast 312 may be presented to the user. In some embodiments, an order for a quantity of the item may be generated and sent to a vendor automatically based on the item demand forecast 312.

Figure 4:
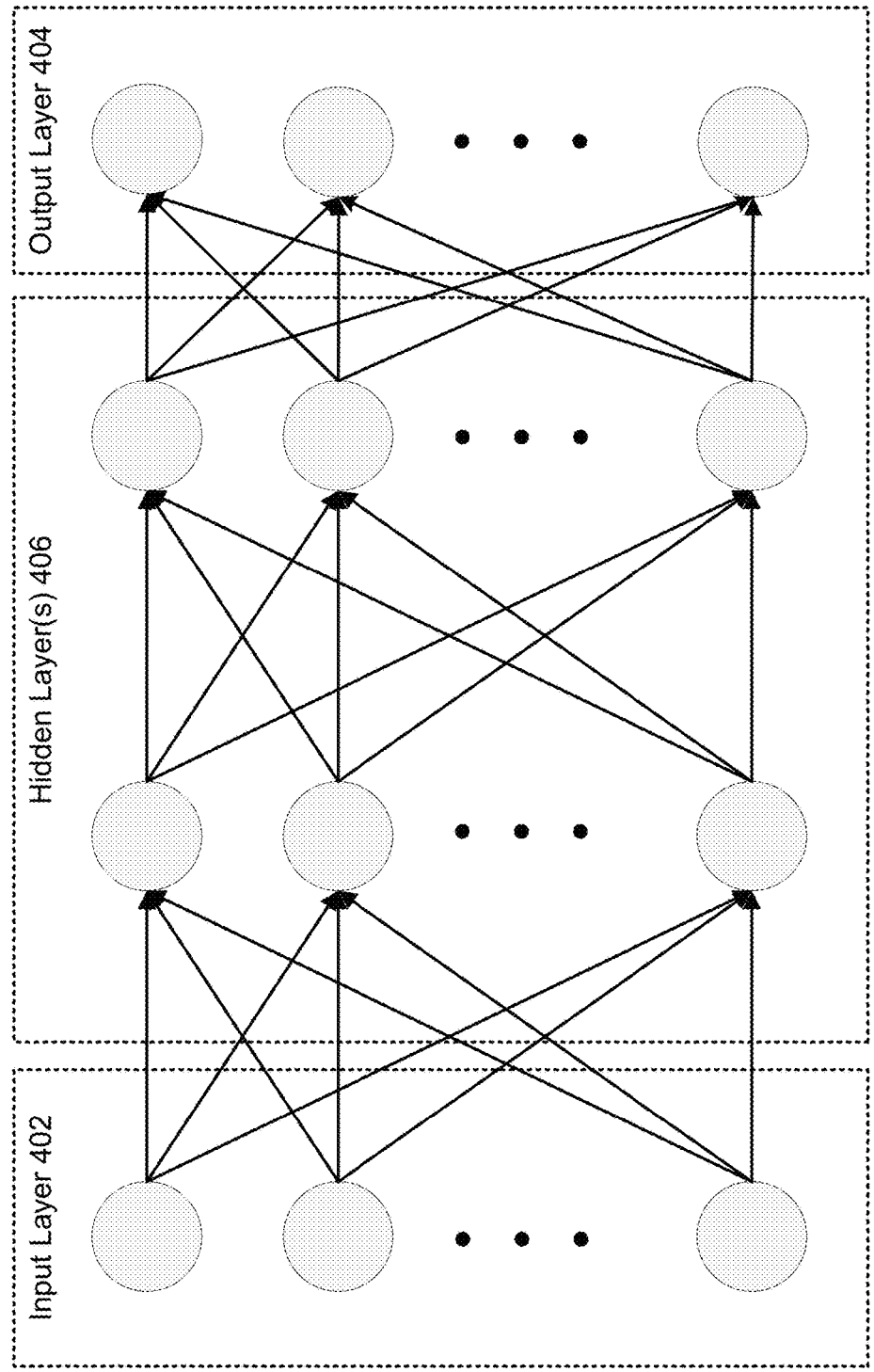
FIG. 4 illustrates an example artificial neural network in accordance with at least some embodiments.

FIG. 4 illustrates an example artificial neural network 400 in accordance with at least some embodiments. A forecasting system may implement embodiments of the neural network 400 as a forecasting model to provide inventory replenishment predictions based on a distribution of quantile losses.

Generally, an artificial neural network 400 represents a network of interconnected nodes, similar to a biological neural network, where knowledge about the nodes is shared across output nodes and knowledge specific to each output node is retained. Each node represents a piece of information. Knowledge can be exchanged through node-to-node interconnections and node-to-task connections. Input to the artificial neural network 400 activates a set of nodes. In turn, this set of node activates other nodes, thereby propagating knowledge about the input. At each set of nodes, transformative functions may be applied to the data. This activation process is repeated across other nodes until an output node is selected and activated.

As illustrated, the artificial neural network 400 includes a series of layers, each representing a set of nodes. On one side of the series of layers exists an input layer 402. The input layer 402 includes a set of nodes that are referred to herein as input nodes. Each of these input nodes may be mapped to a particular feature. In some embodiments, each "feature" may actually comprise a combination of other features. For example, various features might include a distance in time from a particular holiday and/or a particular time grain. In some embodiments, a feature may comprise a combination of the distance from the holiday and the time grain.

On the other side of the series of layers is an output layer 404. The output layer 404 includes a number of output nodes. Each of the output nodes may be mapped to a quantile value. In some embodiments, a value associated with the output node may represent a loss associated with a particular quantile.

One or more hidden layers 406 separates the input layer 402 and the output layer 404. The hidden layers 406 includes "N" number of hidden layers, where "N" is an integer greater than or equal to one. In turn, each of the hidden layers also includes a set of nodes that are referred to herein as hidden nodes.

On one side of the hidden layers 406, hidden nodes are interconnected to the input nodes. Each of the input nodes may be connected to each of the hidden nodes of the hidden layer connected to the input layer 402. On the other side of the hidden layer 406, hidden nodes are connected to the output nodes. Each of the output nodes may be connected to each of the hidden nodes of the hidden layer connected to the output layer 404. In other words, each input node connects to each hidden node in the hidden layer closest to the input layer 402 and each output node connects to each hidden node in the hidden layer closest to the output layer 404. The input nodes are not directly interconnected to the output nodes. If multiple hidden layers exist, the input nodes are interconnected to hidden nodes of the closest hidden layer only. In turn, these hidden nodes are interconnected to the hidden nodes of the next hidden layer and so on and so forth.

An interconnection may represent a piece of information learned about the two interconnected nodes. In comparison a connection between a hidden node and an output node may represent a piece of information learned that is specific to the output node. The interconnection may be assigned a numeric weight that can be tuned (e.g., based on a training dataset), rendering the artificial neural network 400 adaptive to inputs and capable of learning.

Generally, the hidden layer 406 allows knowledge about the input nodes of the input layer 402 to be shared amongst the output nodes of the output layer 404. To do so, an activation function $f$ is applied to the input nodes through the hidden layer 406. In an example, the activation function $f$ may be non-linear. Different non-linear activation functions $f$ are available including, for instance, a rectifier function $f(x)=\max(0, x)$. In an example, a particular non-linear activation function $f$ is selected based on cross-validation. For example, given known example pairs (x, y), where $x \in X$ and $y \in Y$, a function $f:X \rightarrow Y$ is selected when such a function results in the best matches (e.g., the best representations of actual correlation data).

The artificial neural network 400 may also use one or more cost functions (e.g., quantile loss functions) to find an optimal solution (e.g., an optimal activation function). The optimal solution represents the situation where no solution has a cost less than the cost of the optimal solution. In an example, the cost function includes a mean-squared error function that minimizes the average squared error between an output $f(x)$ and a target value y over the example pairs (x, y). In some embodiments, a backpropagation algorithm that uses gradient descent to minimize the cost function may be used to train the artificial neural network 400. Using a backpropagation algorithm, the output values are compared with a correct answer to compute the value of some pre-defined error-function. By various techniques, the error is then fed back through the network. Using this information, the algorithm may adjust the weights of each connection in order to reduce the value of the error function by some small amount. In some embodiments, the artificial neural network 400 may be an autoencoder neural network, in which both inputs and outputs are provided to the artificial neural network during training and the autoencoder learns to reconstruct its inputs.

In the depicted artificial neural network 400, a forecasting model may be generated such that the hidden layer 406 retains information (e.g., specific variable values and/or transformative functions) for a set of input values and output values used to train the artificial neural network 400. This retained information may be applied to a set of user-specific input values in order to determine likely output values. In some embodiments, the artificial neural network 400 may be trained on features of a large number of items so that it may be used to predict future costs associated with those items. For example, an artificial neural network 400 may be used to generate a forecasting model using inputs that include a plurality of item features and outputs that include a set of quantiles (where each quantile is optimized for loss). In this example, the resulting forecasting model may be applied to particular forecast-specific features in order to generate a set of quantiles that may be used to forecast demand for that item.

By way of illustration, a neural network as depicted in FIG. 4 may be trained using various item-related features, such as an item's demand (e.g., sales) during each particular time grain in the previous year, each time grain's proximity to various holidays, and various other item-related features. Additionally, a neural network may be trained on multiple items. Each of the output nodes in this example may represent a quantile (e.g., a percentile associated with a particular time grain and a particular item). In this example, multiple quantiles are provided for each item and for each particular time grain. When generating an item demand forecast using this example neural network, an appropriate output nodes that represents a particular quantile may be selected. A value from that selected quantile may then be used to predict demand for the item. For example, the value may represent a quantity of the item that should be on hand during that specified time grain.

Figure 5:
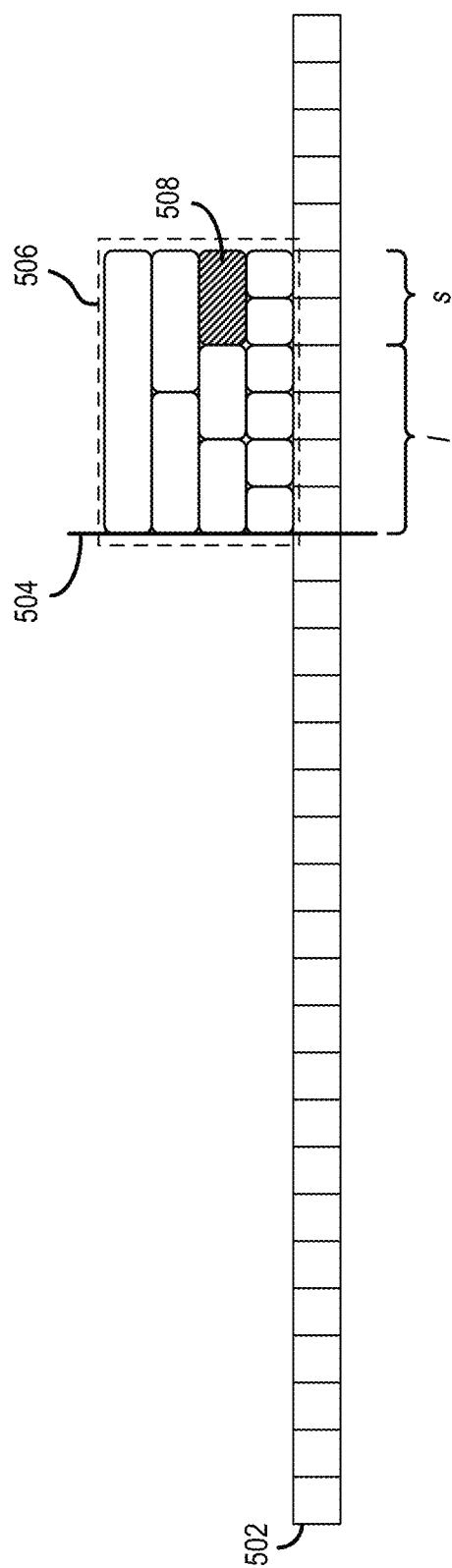
FIG. 5 depicts an illustrative example of a timeline and an associated quantile distribution data in accordance with embodiments of the disclosure.

FIG. 5 depicts an illustrative example of a timeline and an associated quantile distribution data in accordance with embodiments of the disclosure. In FIG. 5, a timeline 502 is depicted as representing demand data for an item with respect to time. A current date 504 is depicted on the timeline 502, such that points on the timeline 502 prior to (e.g., on the left of) the current date 504 represent historical demand for the item whereas points on the timeline 502 after (e.g., on the right of) the current date 504 represent future demand for the item.

Future demand may be forecasted for an item with respect to each time grain in a set of time grains 506. For example, a particular time grain 508 of the set of time grains 506 may represent a period of time during which demand for an item may be forecasted. In some embodiments, a particular time grain 508 may be associated with a lead time l (a length of time until the beginning of the time grain) and a span of time s (a length of time of the time grain). Lead times and/or lengths of time may vary for each time grain in the set of time grains 506.

Figure 6:
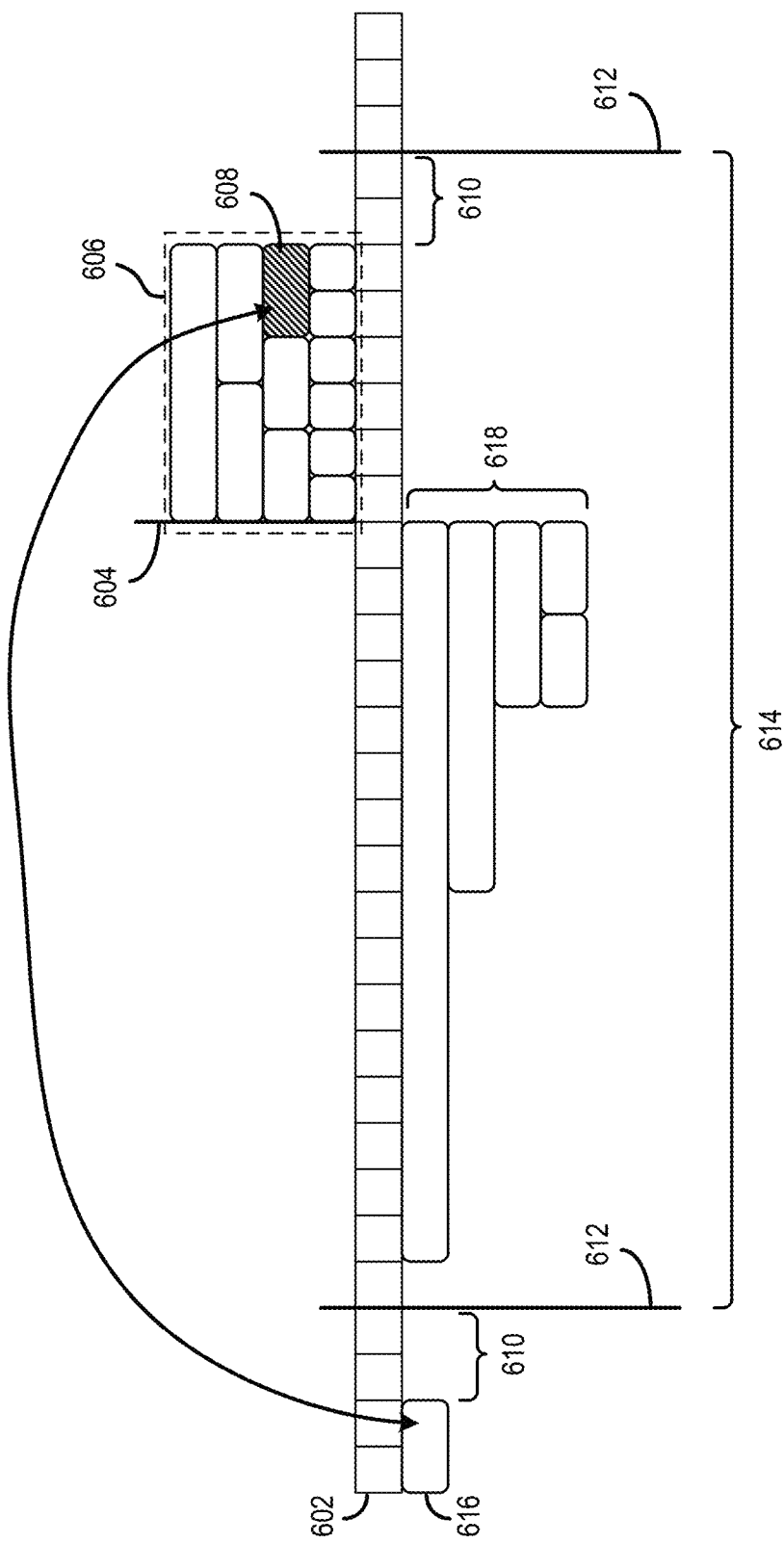
FIG. 6 depicts an illustrative example of a timeline and features that may be used in generating quantile distribution data in accordance with embodiments of the disclosure.

FIG. 6 depicts an illustrative example of a timeline and features that may be used in generating quantile distribution data in accordance with embodiments of the disclosure. In FIG. 6, a timeline 602 is depicted as representing demand data for an item with respect to time. Similar to FIG. 5, a current date 604 is depicted on the timeline 602 as well as a set of time grains 606.

In embodiments of the disclosure, a number of quantiles may be calculated for each time grain 608 in the set of time grains 606. These quantiles may each be associated with a percentage that represents the likelihood that a value associated with the percentage will exceed the actual demand of the item. For example, if a value associated with the quantile P80 for time grain 1 is d, then there is an 80% likelihood that the value d is greater than the actual demand for the item over the span of the time grain 1. Values to be associated with each quantile may be calculated for a particular time grain 608 using a regression module as described above. A number of features may be provided as input to that regression module to calculate these values. For example, in some embodiments a time grain's relative distance 610 to a holiday 612 may be included as input for a regression module. In this example, the time grain's relative distance to each of several holidays (e.g., Valentine's day, Easter, Mother's day, Father's day, Black Friday, Christmas day, etc.) may be provided as input features to the regression module. It should be noted that although a holiday may be a yearly recurring holiday, the distance 614 between the holiday's occurrence may vary. For example, the date upon which Easter falls each year varies from year to year, meaning that the time grain 616 which shares a relative distance 610 to the holiday 612 in the previous year is not necessarily one that occurs one year prior to time grain 608. Additionally, a number of other features may be provided as input to a regression module. For example, demand for an item (e.g., sales) occurring over various time grains 618 prior to the current date 604 may be used as input features for a regression module. In another example, an item's age may also comprise a feature to be provided as input to a regression module.

Figure 7:
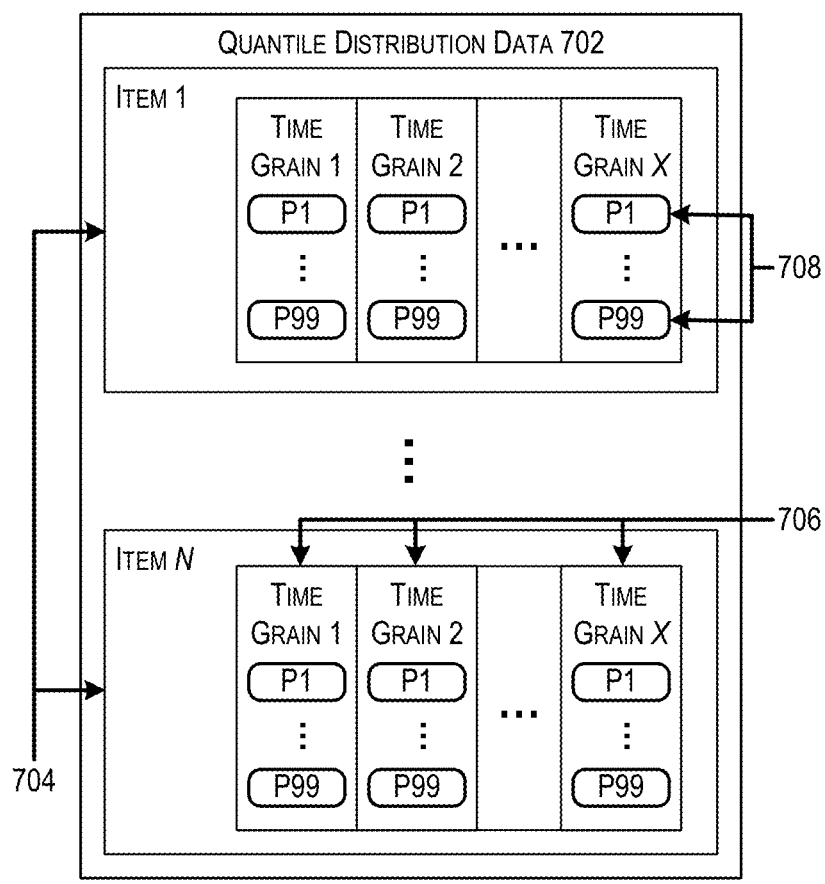
FIG. 7 depicts an illustrative example of a quantile distribution data that may be generated in accordance with at least some embodiments.

FIG. 7 depicts an illustrative example of a quantile distribution data that may be generated in accordance with at least some embodiments. In FIG. 7, a quantile distribution data 702 may be generated by mapping each entry to an output value calculated using a regression module. For example, in the case that a neural network is used by the regression module (as described with respect to FIG. 4), each output node may be mapped to a quantile in the quantile distribution data 702.

In some embodiments, the quantile distribution data 702 may comprise demand values for a number of items 704. In some embodiments, the quantile distribution data 702 may include data for each item in an electronic catalog. In some embodiments, the quantile distribution data 702 may include data for a subset of items in the electronic catalog. For example, the quantile distribution data 702 may compile demand values for the N fastest moving (i.e., most popular) items in the electronic catalog.

In some embodiments, the quantile distribution data 702 may comprise demand values with respect to a number of time grains 706. As depicted, demand forecasts may be calculated for a number of time grains 706 associated with each of the items 704. Demand values within each of these time grains 706 may represent the demand for the item over a span that comprises the specified time grain 706.

In some embodiments, the quantile distribution data 702 may compute demand values associated with a number of percentiles 708, wherein the percentiles each represent the probability that the calculated demand value associated with that percentile is equal to or exceeds an actual demand. In some embodiments, a number p of specific percentiles may be represented in the quantile distribution data 702. For example, the quantile distribution data 702 may include the $50^{th}$ percentile, $60^{th}$ percentile, $70^{th}$ percentile, $80^{th}$ percentile, and $90^{th}$ percentile for a number of different time grains. In this example, each of the specified percentiles may be associated with a different quantile in the quantile distribution data 702.

As depicted, the quantile distribution data 702 may comprise each of a number of quantiles over one or more distributions. The quantile distribution data 702 may comprise include a number of quantiles Q equal to the number of items N*the number of time grains X*the number of percentiles p. In some embodiments, this may comprise millions if not billions, of demand forecast values, each of which is mapped to an output provided by a regression module. In some embodiments, the quantile distribution data 702 may be presented as a matrix or a series of vectors. In some embodiments, the quantile distribution data 702 may comprise one or more database tables, with each quantile representing an entry which is populated with a demand value.

Figure 8:
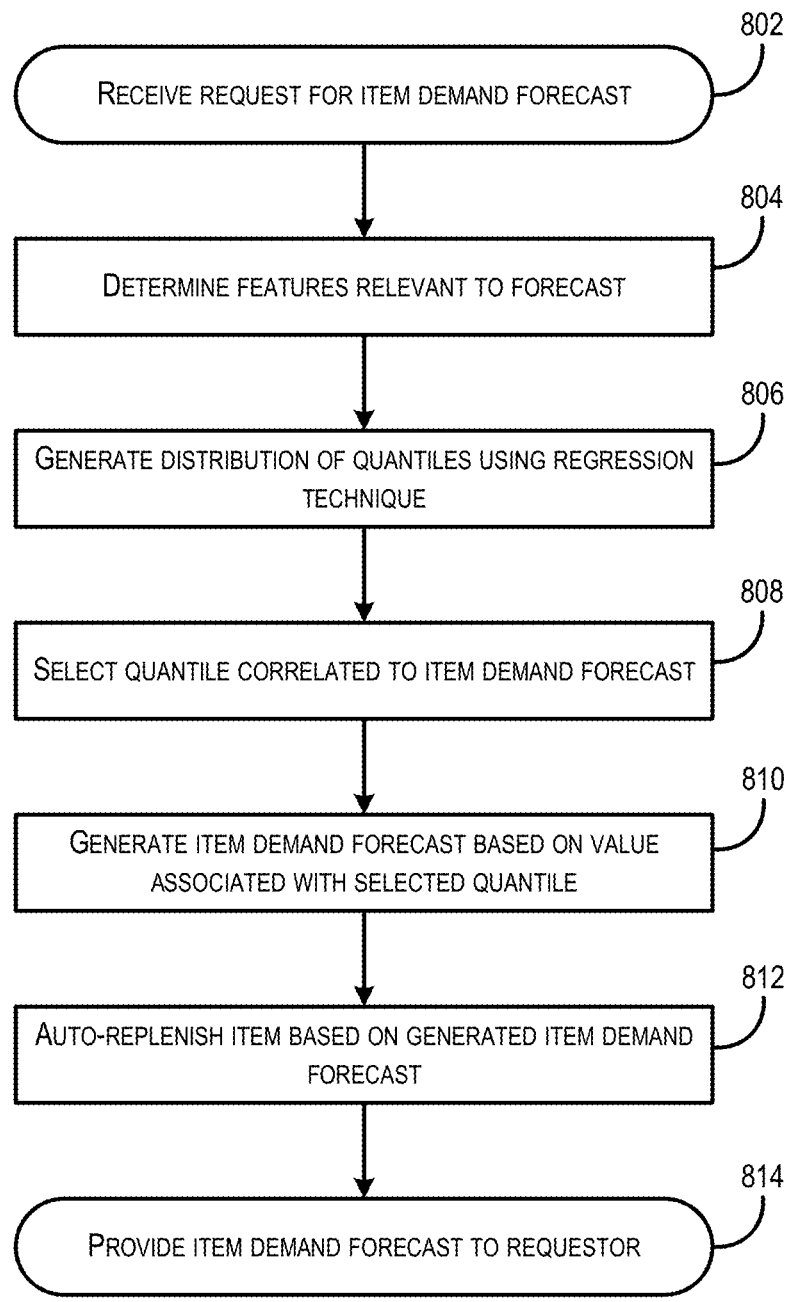
FIG. 8 depicts an illustrative flow diagram demonstrating an example automated replenishment system for predicting item demand and placing replenishment orders based on that demand in accordance with at least some embodiments.

FIG. 8 depicts an illustrative flow diagram demonstrating an example automated replenishment system for predicting item demand and placing replenishment orders based on that demand in accordance with at least some embodiments. The process 800 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein. In accordance with at least one embodiment, the process 800 of FIG. 8 may be performed by at least the one or more service providers 206 shown in FIG. 2.

Process 800 may begin at 802, when a request is received to provide a demand forecast with respect to a particular item. The request may include an indication of a time grain for which demand is to be computed. In some embodiments, the request may identify a particular percentile for which demand is to be forecasted. For example, the request may include a cost ration or other suitable indication of costs associated with an item. By way of illustration, an example cost ratio may be calculated using the formula:

$$\frac{\text{Underage}}{(\text{Underage} + \text{Overage})}$$

Wherein underage represents costs associated with having too few of an item and overage represents the costs associated with having too many of an item. In some embodiments, the cost ratio may be expressed as a percentage such that a quantile associated with a percentile to which the cost ratio is correlated may be selected. By way of example, if the cost ratio is 0.9, then the quantile associated with the $90^{th}$ percentile may be selected.

At 804, features relevant to a requested item demand forecast may be determined. In some embodiments, features may be identified via feature engineering (e.g., they may be selected based on known correlations or relationships). In some embodiments, features may be identified using one or more machine learning techniques. It should be noted that when using certain regression techniques (e.g., neural networks), some correlations will automatically be detected between features related to a first item and demand of a second item.

At 806, a set of quantiles may be generated using one or more regression techniques. To do this, a number of output values associated with a regression module may be mapped to quantiles in the set of quantiles. For example, when using a neural network as describe in FIG. 4, each of the output nodes in the neural network may be mapped to a quantile in the set of quantiles.

At 808, an appropriate quantile of the set of quantiles may be selected. In some embodiments, the appropriate quantile may be selected based on costs. For example, if a cost ratio is 80% or 0.8, then the quantile associated with the $80^{th}$ percentile (for the specified item and time grain) may be selected. In some embodiments, the appropriate quantile may be predetermined for an item. For example, the appropriate quantile may be selected based on a type or category associated with the item, a time of the year, or any other suitable factor.

At 810, an item demand forecast may be generated based on a value associated with the selected quantile. In some embodiments, the value associated with the selected quantile may represent a quantity of the item that the system should have in stock to meet demand. In some embodiments, the quantity may be a fraction or decimal and the item demand forecast may be generated by determining an appropriate integer for the quantity. In some embodiments, the item demand forecast may be generated by applying some function to the value associated with the selected quantile.

In some embodiments, at 812 an auto-order may be generated based on the item demand forecast. In some embodiments, multiple auto-orders may be generated based on item availability, item expiration dates, item shipping times, or any other suitable factors. For example, upon determining that 20 of an item A are needed within a two-week time grain and that item A has an expiration date of one week, auto-orders may be generated to order 5 of item A every half week. In another embodiment, upon determining that 10 of an item B are needed within a one-week time grain, it may further be determined the Vendor 1 has 6 of item B and Vendor 2 has 5 of item B. Two auto-orders may be generated, with one directed to each of the vendors. In some embodiments, the auto-orders may be generated in such a way that costs are optimized (e.g., orders to the least expensive vendor may be maximized). In some embodiments, at 814 the generated item demand forecast may be provided to a requestor.

Embodiments of the disclosure provide for a number of technical advantages. For example, by generating a set of quantiles associated with a probability distribution, an item forecast may be generated and/or regenerated based on adjusting costs without re-creating the regression model. Additionally, the set of quantiles is generated for a number of items based on item features. In at least some embodiments (e.g., those using a neural network or other suitable regression techniques) unobvious correlations between item features and item demand is automatically accounted for, even if the features are associated with a different item than the demand. Additionally, the system provides for significantly more accurate item demand forecasts than prior art systems. It should be noted that implementation of the disclosed system in a test environment has demonstrated substantial savings over such prior art systems based on cost optimization provided using the system.

Furthermore, in current systems the number of regression models would be large as one may be generated for each time grain, etc. However, in embodiments of the disclosure, a single regression model (e.g., neural network) may be trained across multiple time grains and items. This allows the regression model to learn a hidden layer representation that is shared among the multiple output nodes, thus obviating the need to train a separate network for each individual output. This vastly decreases the amount of training time required for the regression model as the system does not need to train a multitude of separate regression models.

Figure 9:
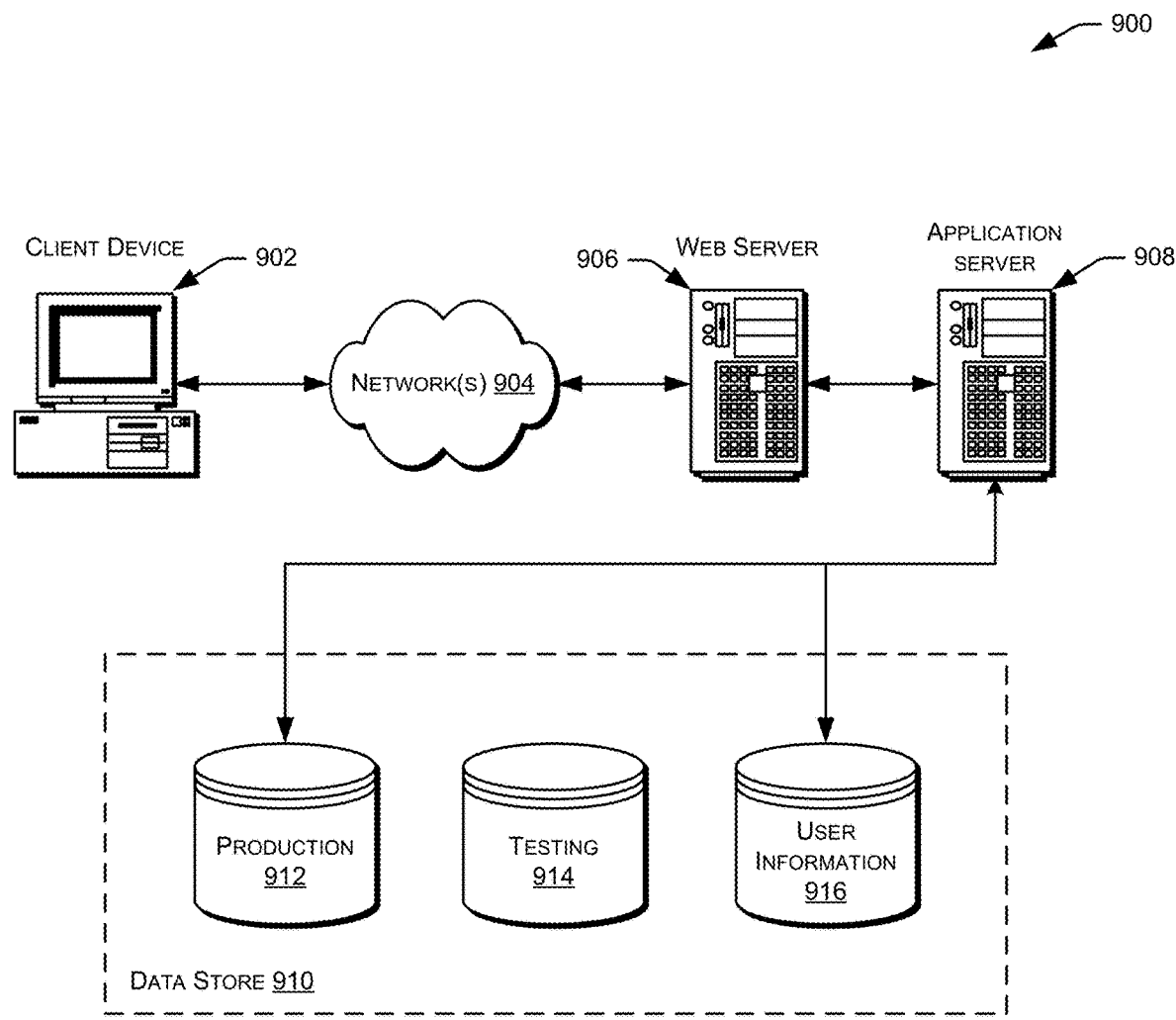
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environtext in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system comprising:
    a processor; and
    a memory including instructions that, when executed with the processor, cause the system to, at least:
        receive a request for an item demand forecast, the request including an indication of a specific time grain and an indication of a probability;

generate, using a neural network, a probability distribution of demand non-parametrically represented as a set of quantiles, wherein the neural network is trained using a plurality of quantile loss functions;

generate, using the neural network, the set of quantiles for each of a plurality of time grains as a plurality of output nodes in an output layer of the neural network, wherein the plurality of time grains includes the specific time grain, and wherein each output node of the plurality of output nodes corresponds to a particular demand value for the item and a particular time grain of the plurality of time grains;

select, from the probability distribution, a quantile of the set of quantiles correlated to the specific time grain and the probability;

determine a demand associated with the selected quantile; and generate the item demand forecast based on the value associated with the selected quantile.

2. The system of claim 1, wherein the instructions further cause the system to automatically generate at least one order based at least in part on the item demand forecast.

3. A computer-implemented method, comprising:

receiving a request for an item forecast including an indicated time grain and an indicated probability value;

generating, using a regression model, a probability distribution associated with a plurality of demand values, wherein the regression model is trained using a plurality of quantile loss functions;

generating, using the regression model, the plurality of demand values for each of a plurality of time grains as a plurality of output nodes in an output layer of the regression model, wherein the plurality of time grains includes the indicated time grain, and wherein each output node of the plurality of output nodes corresponds to a particular demand value for an item associated with the item forecast and a particular time grain of the plurality of time grains;

selecting, from the plurality of demand values, a demand value correlated to the indicated time grain and the indicated probability value; and generating the item forecast based on the selected demand value.

4. The computer-implemented method of claim 3, wherein the probability distribution is represented as a parametric distribution.

5. The computer-implemented method of claim 3, wherein the probability distribution is non-parametrically represented as a set of quantiles.

6. The computer-implemented method of claim 3, wherein the demand value is selected based on a cost ratio.

7. The computer-implemented method of claim 6, wherein the cost ratio comprises a ratio of underage costs for an item to total costs for the item.

8. The computer-implemented method of claim 3, wherein the probability distribution is associated with a plurality of percentiles.

9. The computer-implemented method of claim 8, wherein each of the plurality of percentiles is associated with a confidence level.

10. The computer-implemented method of claim 8, wherein multiple percentiles of the plurality of percentiles are associated with each time grain of the plurality of time grains.

11. The computer-implemented method of claim 10, wherein the item associated with the item forecast is one of a plurality of items and multiple time grains of the plurality of time grains are associated with each item in the plurality of items.

12. A computer-implemented method comprising:

training a neural network having a shared input layer, a shared hidden layer and a plurality of output layers, individual output layers corresponding to one of a plurality of demand forecast horizons and comprising a set of output nodes corresponding to a set of quantiles of a demand probability distribution, wherein the neural network is trained using a plurality of quantile loss functions;

receiving a request for a particular time grain and a particular confidence level;

presenting inputs with current values to the input layer of the trained neutral network;

generating, using the neural network, the set of quantiles for each of a plurality of time grains as a plurality of output nodes in an output layer of the plurality of output layers of the neural network, wherein the plurality of time grains includes the particular time grain, and wherein each output node of the plurality of output nodes corresponds to the particular confidence level for an item associated with the request and the particular time grain of the plurality of time grains;

selecting the output layer of the neural network corresponding to the particular time grain;

selecting an output of the selected output layer corresponding to the particular confidence level; and generating the demand forecast based on a value of the selected output.

13. The computer-implemented method of claim 12, wherein the value associated with the selected output represents a predicted demand for the item associated with an item forecast.

14. The computer-implemented method of claim 13, wherein the predicted demand comprises a quantity of the item that is predicted to be sold during the particular time grain.

15. The computer-implemented method of claim 12, wherein the inputs comprise historical demand for the item.

16. The computer-implemented method of claim 15, wherein the historical demand is calculated with respect to a relative time distance to a number of events.

17. The computer-implemented method of claim 16, wherein the number of events are a number of holidays and the inputs comprise historical demand in relation to a relative time distance to each holiday of the number of holidays.

* * * * *

UNITED STATES PATENT AND TRADEMARK OFFICE
CERTIFICATE OF CORRECTION

| | |
|---|---|
| PATENT NO. | : 10,783,442 B1 |
| APPLICATION NO. | : 15/384007 |
| DATED | : September 22, 2020 |
| INVENTOR(S) | : Kari E. Torkkola et al. |

It is certified that error appears in the above-identified patent and that said Letters Patent is hereby corrected as shown below:

In the Claims

Column 20, Line 24, Claim 12:
Delete: "the trained neutral network"
Insert: --the trained neural network--

Signed and Sealed this
Sixth Day of April, 2021

Drew Hirshfeld
*Performing the Functions and Duties of the
Under Secretary of Commerce for Intellectual Property and
Director of the United States Patent and Trademark Office*